United States Patent
Koops et al.

(10) Patent No.: US 7,254,628 B2
(45) Date of Patent: Aug. 7, 2007

(54) NETWORK MANAGEMENT SYSTEM WITH VALIDATION OF POLICIES

(75) Inventors: Mark Koops, Montlhery (FR); Paul Labrogere, Paris (FR); Francis Detot, Saint-Michel-sur-Orge (FR)

(73) Assignee: Alcatel, Paris (FR)

( * ) Notice: Subject to any disclaimer, the term of this patent is extended or adjusted under 35 U.S.C. 154(b) by 941 days.

(21) Appl. No.: 10/340,687

(22) Filed: Jan. 13, 2003

(65) Prior Publication Data
US 2004/0225727 A1 Nov. 11, 2004

(30) Foreign Application Priority Data
Jan. 14, 2002 (FR) .................................. 02 00371

(51) Int. Cl.
*G06F 15/173* (2006.01)
(52) U.S. Cl. .................. 709/223; 709/224; 709/225; 709/226
(58) Field of Classification Search ................ 709/223, 709/224, 225, 226, 220; 707/1
See application file for complete search history.

(56) References Cited

U.S. PATENT DOCUMENTS 6,243,747 B1 * 6/2001 Lewis et al. ................ 709/220

2003/0037040 A1 * 2/2003 Beadles et al. ................ 707/1

FOREIGN PATENT DOCUMENTS

WO WO 97/37477 A2 10/1997

OTHER PUBLICATIONS

Lupu E C et al: "Conflicts in Policy-Based Distributed Systems Management" IEEE Transactions on Software Engineering, IEEE Inc. New York, US, vol. 25, No. 6, Dec. 1999, pp. 852-869, XP002177589.

* cited by examiner

*Primary Examiner*—Ario Etienne
*Assistant Examiner*—Sahera Halim
(74) *Attorney, Agent, or Firm*—Sughrue Mion, PLLC

(57) ABSTRACT

A network management system (NMS) including a policy manager (PM) associated with a set of policies and including distribution means for sending said policies to policy enforcement points ($PEP_1$, $PEP_2$, $PEP_3$, $PEP_4$) in accordance with distribution instructions via policy decision points ($PDP_1$, $PDP_2$), characterized in that said policy manager further includes validation means for validating if said policy enforcement points can enforce said policies and correcting said distribution instructions as a function of said validation.

15 Claims, 2 Drawing Sheets

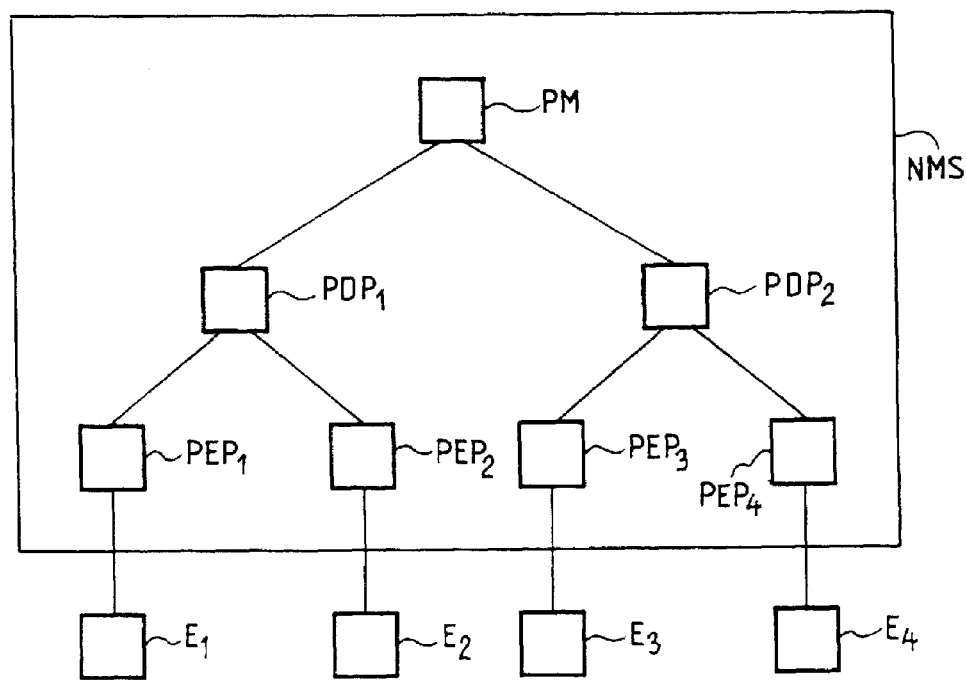
FIG_1 RELATED ART
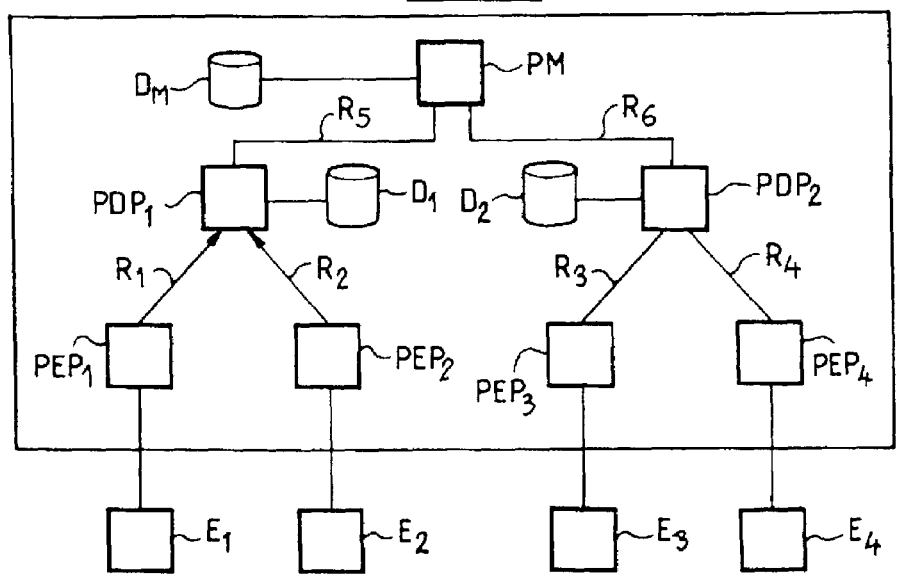
FIG_2

FIG_3
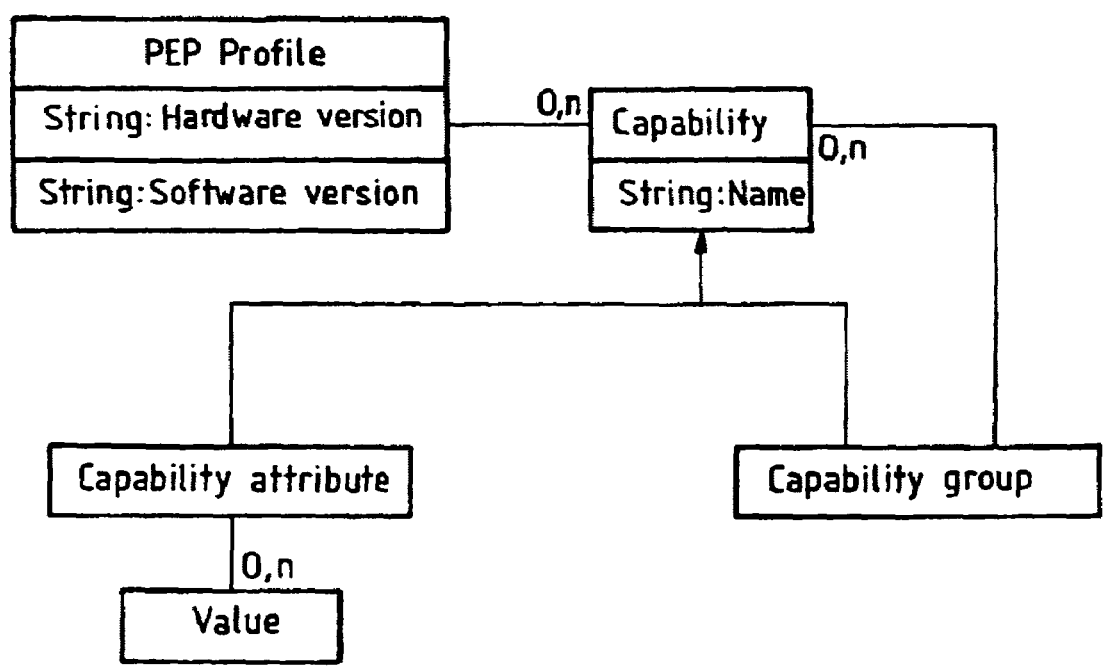

NETWORK MANAGEMENT SYSTEM WITH VALIDATION OF POLICIES

The present invention relates to a policy-based network management system. It relates more particularly to how policies are distributed across all of the points of the network at which the policies are enforced.

BACKGROUND OF THE INVENTION

Accordingly, as shown in FIG. 1, a network N, in particular a telecommunications network, is made up of a set of equipment units $E_1$, $E_2$, $E_3$, $E_4$. It is generally associated with a network management system NMS, one object of which is to manage the behavior of the network, as function of requests submitted to it. In particular, each service request from a client can lead to reconfiguration of some of the network equipment. This reconfiguration is more widely known as "service provisioning".

A conventional way to establish a dynamic link between requests (in particular service requests) and the required reconfigurations is to define a set of policies. This approach is recommended by the Internet Engineering Task Force (IETF) and is described in its RFC 3060 "Policy Care Information Model—Version 1 Specification", February 2001, and RFC 3198 "Terminology for Policy-Based Management", November 2001, for example.

The policies are managed by a Policy Manager PM. The policy manager PM sends the policies to policy decision points $PDP_1$, $PDP_2$ in accordance with distribution instructions. The distribution instructions are typically provided by the operator when the policies are created.

Finally, the policy decision points $PDP_1$, $PDP_2$ send the policies to policy enforcement points $PEP_1$, $PEP_2$, $PEP_3$, $PEP_4$. The policy enforcement points $PEP_1$, $PEP_2$, $PEP_3$, $PEP_4$ are associated with respective network equipment units $E_1$, $E_2$, $E_3$, $E_4$.

Because it uses policies, the network is able to adapt dynamically and automatically to requests, in particular service requests, as and when they arise.

However, this kind of approach has a major drawback in that it presumes that the distribution instructions are free of errors. This leaves the operator responsible for defining the policies and distribution instructions, which is a heavy responsibility, and for the time-consuming task of consulting a detailed map of the network in order to determine the capabilities of each network equipment unit.

In the event of an error, a policy enforcement point PEP will attempt to apply a policy to a network equipment unit that is incapable of enforcing it. This can interfere with the operation of the network unit and, on the other hand, lead to poor performance of the policy deployed by the operator.

OBJECT AND BRIEF SUMMARY OF THE INVENTION

The object of the invention is to alleviate these problems, i.e. to propose a network management mechanism and system which Facilitate the writing and deployment of policies by the operator, and Guarantee that a policy will not be deployed at an incorrect policy enforcement point.

To this end, the invention provides a network management system including a policy manager associated with a set of policies and including distribution means for sending said policies to policy enforcement points in accordance with distribution instructions via policy decision points. This network management system is characterized in that the policy manager further includes:

means for receiving capability profiles of said policy enforcement points; and validation means for validating if said policy enforcement points can enforce said policies, as a function of said capability profiles, and correcting said distribution instructions as a function of said validation.

The capability profiles may come from policy decision points.

The invention also provides a decision point, in which said policies are sent by a policy manager of the network management system. The decision point includes distribution means for sending said policies to policy enforcement points in accordance with distribution instructions. It is characterized in that it further includes means for receiving capability profiles from said policy enforcement points and sending them to said policy manager.

In an implementation of the invention, it further includes validation means for validating said policies as a function of said capability profiles.

BRIEF DESCRIPTION OF THE DRAWINGS

The invention and its advantages become more clearly apparent in the course of the following description, which is given with reference to the accompanying drawings.

FIG. 1, already commented on, is a diagram of a policies-based network management system.

FIG. 2 shows a policies-based network management system in accordance with the invention.

FIG. 3 is a diagram defining capability profiles for one embodiment of the invention.

MORE DETAILED DESCRIPTION

FIG. 2 shows a network N including four equipment units $E_1$, $E_2$, $E_3$ and $E_4$. The equipment units are associated with respective policy enforcement points $PEP_1$, $PEP_2$, $PEP_3$ and $PEP_4$ of a network management system NMS.

The network management system further includes a policy manager PM and two policy decision points $PDP_1$ and $PDP_2$. The policy enforcement points $PEP_1$ and $PEP_2$ are connected to the policy decision point $PDP_1$ and the policy enforcement points $PEP_3$ and $PEP_4$ are connected to the policy decision point $PDP_2$. The two policy decision points $PDP_1$ and $PDP_2$ are connected to the policy manager PM.

The operator enters into the policy manager PM a set of policies associated with distribution instructions.

The distribution instructions determine the policy enforcement points to which the policies must be sent.

According to the invention, the policy manager further includes validation means. The role of the validation means is to validate the policies and distribution instructions, i.e. to verify that the policy enforcement points indicated by the distribution instructions are capable of enforcing the policies.

If necessary, the distribution instructions are modified to take account of this incompatibility.

The validation effected by the policy manager PM can be only a relatively high level validation. For example, it can concern itself only with large classes of capabilities such as "Quality of Service" (QoS), "Traffic formatting", "Network Address Translation" (NAT) and "Multi-Protocol Label Switching (MPLS) protocol support". Each policy enforcement point has a list of capabilities that can be described in terms of the above classes.

To be more precise, for each policy, the validation means look at the policy enforcement points (PEP) at which it must be deployed, according to the associated distribution instructions. It verifies that the policy actually relates to a class that is part of the list of capabilities of each policy enforcement point.

If not, the distribution instructions can be modified so that they no longer designate the policy enforcement point concerned.

The policies are then sent to the policy decision points (PDP), in accordance with the distribution instructions, which have if necessary been modified.

At this stage, a second validation can be effected, this time at a higher level of precision: the validation means can then take into account the attributes of the capabilities of the policy enforcement points (PEP).

In the same manner as previously, the distribution instructions can if necessary be modified in line with the validation.

Then the policies are finally sent to the policy enforcement points (PEP) in the certainty that the latter are in a position to enforce them.

In one embodiment of the invention, the policy manager PM and the policy decision points $PDP_1$, and $PDP_2$ include means for receiving capability profiles of the policy enforcement points $PEP_1$, $PEP_2$, $PEP_3$ and $PEP_4$.

Each policy enforcement point sends the policy decision point to which it is connected a capability profile in messages $R_1$, $R_2$, $R_3$ and $R_4$. The decision point sends the capability profile to the policy manager in messages $R_5$, $R_6$.

The capability profiles can be stored by the policy decision points $PDP_1$ and $PDP_2$ in respective databases $D_1$ and $D_2$ and by the policy manager PM in a database $D_M$.

In one embodiment, it is possible to wait to receive the capability profiles of all the policy enforcement points before sending them to the policy manager PM in a single message. The benefit of this is that it minimizes the number of messages exchanged.

The capability profiles can be sent when registering policy enforcement points $PEP_1$, $PEP_2$, $PEP_3$ and $PEP_4$ with policy decision points $PDP_1$, $PDP_2$ and when registering policy decision points with the policy manager PM.

FIG. 3 shows the capability profiles that are exchanged in the Unified Modeling Language (UML).

One example of a capability profile might be:

---

<PEPProfile> PEP1
      <CapabilityGroup> QoS
        <CapabilityGroup> TrafficConditioning
          <CapabilityAttribute> Scheduling
            <Value> Token Bucket Filter
            <Value> Class-based Filter
        <CapabilityGroup> PerHopBehavior
        <CapabilityGroup> FireWall
        <CapabilityGroup> NAT

---

Reverting to the FIG. 2 example, the policy enforcement point $PEP_1$ sends this profile to the policy decision point $PDP_1$ when the former is registered with the latter.

When the policy decision point $PDP_1$ is registered with the policy manager PM, it sends it the capability profile in the same message.

The policy manager can then perform the high level validation, for example based only on the capability groups of the first level QoS, "TrafficConditioning", "PerHopBehavior", "FireWall", "NAT".

If the policy concerns network address translation, the validation means of the policy manager PM can restrict themselves to detecting the presence of an "NAT"capability group in the capability profile of the policy enforcement point $PEP_1$. If so, the policy is sent to the policy decision point $PDP_1$ to which the policy enforcement point $PEP_1$ is connected.

After receiving the policy, the validation means of the policy decision point $PDP_1$ can carry out the lower level validation concerning the lower level capability groups as well as the attributes (CapabilityAttribute) and their values (Value).

It may be only after this second validation that the policy is finally sent to the policy enforcement point $PEP_1$ to be enforced there.

What is claimed is:

1. A network management system comprising:
   policy enforement points applying policies to equipment units;
   policy decision points connected to the policy enforcement points; and
   a policy manager associated with said policies and comprising:
      distribution means for sending said policies to said policy enforcement points in accordance with distribution instructions via said decision points,
      means for receiving capability profiles of said policy enforcement points, and
      validation means for validating if said policy enforcement points can enforce said policies, as a function of said capability profiles, and correcting said distribution instructions as a function of said validation.

2. The network management system according to claim 1, wherein said capability profiles come from said policy decision points.

3. The network management system according to claim 1, wherein each of said policy decision points comprises means for validating said policies as a function of said capability profiles.

4. The network management system according to claim 1, wherein said policies are distributed, by said policy manager, to said policy enforcement points based on said corrected distribution instructions.

5. The network management system according to claim 1, wherein said distribution instructions indicate which of said policy enforcement points are to receive said policies.

6. The network management system according to claim 1, wherein each of said policy enforcement points comprise means for generating a capability profile message comprising capability profile of a respective policy enforcement point and means for sending said generated capability profile message to a respective policy decision point, wherein said capabilities profile comprise at least one of quality of service capability of the respective policy enforcement point, traffic formatting capability of said respective policy decision point, network address translation capability of said respective policy decision point, and multi-protocol label switching protocol support capabilities of said respective policy decision point.

7. The network management system according to claim 6, wherein said respective policy decision point comprises means for storing said received capability profile message and means for sending said received capability profile message to said policy manager.

8. The network management system according to claim 7, wherein said policy manager comprises means for storing said capability profile message received from said respective policy decision point and said validation means determine whether said respective policy enforcement point is capable of enforcing said policies designated for said respective policy enforcement point by the distribution instruction, wherein said validation is performed by checking whether the policies actually relate to a class that is part of said capabilities of said respective policy enforcement point as specified in said received capability profile message.

9. The network management system according to claim 8, wherein said policy manager further comprises means for correcting said distribution instructions based on results of said validation by said validating means.

10. The network management system according to claim 9, wherein said correcting by said correcting means comprises deleting said respective policy enforcement point from said distribution instructions.

11. The network management system according to claim 1, wherein each of said capabilities profiles comprise quality of service capability of a respective policy enforcement point, traffic formatting capability of the respective policy decision point, network address translation capability of the respective policy decision point, and multi-protocol label switching protocol support capabilities of the respective policy decision point, and wherein said distribution instructions designate which of said policy decision points are to receive said policies.

12. The network management system according to claim 1, wherein said validation means of said policy manager execute high level validation and wherein each of said policy decision points comprises means for executing low level validation that checks lower level capabilities of a respective policy enforcement point.

13. The network management system according to claim 12, wherein said each policy decision point comprises means for correcting the distribution instructions based on said low level validation.

14. The network management system according to claim 13, wherein said correcting of said distribution instructions comprises removing said respective policy enforcement point whose low level capabilities cannot enforce said policies designated for said respective policy enforcement point.

15. A policy decision point, comprising:
   means for receiving capability profiles from policy enforcement points;
   means for validating whether said policy enforcement points can enforce policies based on the received capability profiles;
   means for correcting distribution instructions indicating which of said policy enforcement points are to receive some of said policies, based on said validation; and
   means for sending said received capability profiles to a policy manager,
   wherein said policies are sent by said policy manager of a network management system to said policy enforcement points via said policy decision point based on the distribution instructions.

* * * * *